United States Patent
Micke et al.

(10) Patent No.: US 6,851,316 B2
(45) Date of Patent: Feb. 8, 2005

(54) APPARATUS AND METHOD FOR RECOVERY AND RECYCLE OF TRACER GAS FROM LEAK TESTING PROCESS WITH RANDOMLY VARYING DEMAND

(75) Inventors: André Micke, Summit, NJ (US); Igor Shedletsky, Staten Island, NY (US)

(73) Assignee: The BOC Group, Inc., New Providence, NJ (US)

( * ) Notice: Subject to any disclaimer, the term of this patent is extended or adjusted under 35 U.S.C. 154(b) by 0 days.

(21) Appl. No.: 10/351,771

(22) Filed: Jan. 27, 2003

(65) Prior Publication Data

US 2004/0144161 A1 Jul. 29, 2004

(51) Int. Cl.[7] .......................... G01M 3/02; G01M 3/20; G01M 3/22
(52) U.S. Cl. .......................... 73/407; 73/4; 73/405 RO; 73/492; 73/493
(58) Field of Search .................................... 73/40–49.8

(56) References Cited

U.S. PATENT DOCUMENTS

| | | | | | |
|---|---|---|---|---|---|
| 3,577,769 | A | * | 5/1971 | Roberts | 73/40.7 |
| 3,675,468 | A | * | 7/1972 | Caccamesi et al. | 73/40.7 |
| 3,729,983 | A | * | 5/1973 | Coppens | 73/40.7 |
| 4,984,450 | A | * | 1/1991 | Burger | 73/40.7 |
| 5,172,583 | A | * | 12/1992 | Tallon | 73/40.7 |
| 5,377,491 | A | * | 1/1995 | Schulte | 62/63 |
| 5,390,533 | A | | 2/1995 | Schulte et al. | 73/40.7 |
| 5,452,583 | A | * | 9/1995 | Schulte | 62/63 |
| 5,563,336 | A | * | 10/1996 | Mallet | 73/49.1 |
| 6,119,507 | A | | 9/2000 | Flosbach et al. | 73/40.7 |
| 6,196,056 | B1 | * | 3/2001 | Ewing et al. | 73/40.7 |
| 6,530,264 | B1 | * | 3/2003 | Rink et al. | 73/40.7 |

* cited by examiner

*Primary Examiner*—Hezron Williams
*Assistant Examiner*—David A. Rogers
(74) *Attorney, Agent, or Firm*—Philip H. Von Neida

(57) ABSTRACT

An apparatus and method for recovering and recycling a tracer gas from a leak testing process. The apparatus comprises a leak testing section, a gas recovery/blending section, and a gas analysis/recycle section. The leak testing section operates to perform various leak testing functions and comprises a plurality of test parts, a plurality of gas supply valves, and a plurality of gas discharge valves. The gas recovery/blending section functions to blend gases together and comprises a virgin gas storage means associated with a flow control means and a recovered gas storage means having a pressure analysis means and recovered gas analysis means. The gas analysis/recycle section operates to analyze, store, and deliver a tracer gas and comprises compressor, blended gas storage means, blended gas analysis means, pressure analysis/adjustment means, and temperature analysis means. In preferred embodiments, the gas analysis/recycle section also includes a vent, compressor bypass loop, and a recycled gas analysis means.

12 Claims, 3 Drawing Sheets

APPARATUS AND METHOD FOR RECOVERY AND RECYCLE OF TRACER GAS FROM LEAK TESTING PROCESS WITH RANDOMLY VARYING DEMAND

BACKGROUND OF THE INVENTION

1. Field of the Invention

The invention generally relates to a leak testing process. In one aspect, the invention relates to a multi-part leak testing process that employs helium while in another aspect, the invention relates to a recovery and recycling apparatus for use in the process.

2. Description of the Related Art

Leak testing processes that employ a tracer gas are often utilized to detect cracks, apertures, porousness, and the like in test parts. Such leak testing processes typically involve pressurizing the test part with the tracer gas, applying either a vacuum or a "sniff test" method, and then monitoring the test part for a leak or leaks. Monitoring of the test part can include attempting to detect any of the tracer gas that may be escaping from the test part and/or by measuring a flow rate of the tracer gas entering the test part via a leak or leaks. Commonly, prior to pressurization, the test parts are evacuated or purged with tracer gas such that they are free of any air or other gases that may have been trapped within the test part.

Tracer gases that are commonly found in leak testing processes include pure helium (i.e., virgin helium) and helium-containing mixtures having a helium concentration of about 90% to about 99.995% helium by volume. These helium-containing mixtures can include, for example, a helium-nitrogen mixture, a helium-argon mixture, a helium-air mixture, or a helium-carbon dioxide mixture. Helium is the preferred tracer gas since it is capable of quickly infiltrating the smallest cracks, crevices, apertures, and the like in the test parts. Helium is also capable of quick and easy detection by an analyzer (e.g., a helium detector) and is completely inert and non-reactive.

Undesirably, in conventional leak testing processes, helium is usually vented to the atmosphere after having been used only once. Since helium is a non-renewable resource and is produced as a by-product of natural gas production, helium can be quite expensive. To improve the cost effectiveness of using helium, various systems for recovering and recycling the gas have been attempted. For example, in U.S. Pat. No. 6,119,507 to Flosbach, et. al. a method and apparatus is described that recovers a test gas from a single test chamber (i.e., a single test part) by creating a pressure differential between the test chamber and the low pressure storage, and by utilizing a vacuum pump is described. The recovered gas is then re-compressed and stored in a high-pressure storage device. The purity of the recovered test gas is measured and, if the helium concentration is too low, an amount of the recovered (i.e., contaminated) test gas is vented from the system. The vented test gas is thereafter replaced with an equal amount of fresh test gas. Alternatively, a compensation in the sensitivity of leak testing equipment can be made based on the purity of the test gas. As a further example, in U.S. Pat. No. 5,390,533 to Schulte, et. al., a process and system for pressurizing a vessel with a helium-containing gas, recovering the gas, and then purifying the gas for reuse is described.

Unfortunately, known leak testing processes that include recovery and recycling systems have produced results that lack accuracy or stable purity control of the recovered and recycled helium. As such, the helium concentration (i.e., purity) of the recovered and recycled helium progressively deteriorates with time due to a build-up of contaminants (e.g., impurities, debris, other gases, etc.). All too often, depressurization of the recovery and recycling system is therefore required to permit the contaminated gas to purge from the system and to be replaced with fresh helium (e.g., pure helium, virgin helium, or helium with an acceptable helium concentration).

In addition, the typical leak testing processes often involve multiple, randomly-operated test parts that have different internal volumes existing at dissimilar test pressures. Therefore, when a conventional leak testing process having a recovery and recycling system is operated, the recycled helium delivery pressure is highly variable due to fluctuating flow demand. Even relatively minor changes in tracer gas composition, purity, and/or delivery pressure have a negative impact on production efficiency and leak testing process stability. This is unacceptable in a high speed, high-volume production environment, and it often results in the uneconomical use of helium.

Also, leak testing processes that include recovery and recycling systems often have a discontinuous process behavior. In other words, a flow of the tracer gas into the process is not the same as a flow of the tracer gas out of the process. As a result, during recycling of the tracer gas, problems can arise. For example, the level of impurities introduced into the leak testing process increases as a flow of the recycled gas increases and decreases as the flow of the recycled gas decreases. Moreover, a pressure in a buffer tank at the outlet of the recovery and recycling system can fluctuate as a result of the buffer tank being either over-filled or under-filled as a randomly fluctuating flow of recovered gas is introduced into the system.

Thus, a multiple test part leak testing process having a tracer gas recovery and recycling system that can increase a tracer gas recovery rate and permit tracer gas purity and delivery pressure to be maintained, regardless of tracer gas flow demand, is desirable. Likewise, a multiple test part leak testing process having a tracer gas recovery and recycling system that can overcome the effect of tracer gas purity fluctuation is desirable.

SUMMARY OF THE INVENTION

According to this invention, leaks are detected in one or more test parts by a method comprising:
  introducing a tracer gas into one or more test parts;
  recovering at least a portion of the tracer gas from the one or more test parts;
  analyzing the recovered tracer gas for at least one of pressure and contaminants;
  adding a virgin tracer gas to the recovered tracer gas to produce a blended tracer gas having a concentration of contaminants below a pre-determined concentration;
  adjusting the blended tracer gas to a pre-determined pressure; and
  returning the blended tracer gas to the one or more test parts.

In one embodiment, the tracer gas is helium or a mixture of helium and one or more other gases, e.g., nitrogen, argon, air, etc. In another embodiment, the tracer gas is a virgin tracer gas, a contaminated tracer gas or a blended tracer gas comprising the virgin tracer gas and the contaminated tracer gas. In another embodiment, a compressor capable of producing both positive and negative pressures provides the means for effecting the introduction and recovery steps while in still another embodiment, the method includes the purification, e.g., the removal of contaminates, from the recovered tracer gas.

In another embodiment, the invention is a method for detecting leaks simultaneously in two or more test parts, the method comprising:

introducing a tracer gas into one or more test parts;

recovering at least a portion of the tracer gas from the test parts;

analyzing the recovered tracer gas for at least one of pressure and contaminants;

adding a virgin tracer gas to the recovered tracer gas to produce a blended tracer gas having a concentration of contaminants below a pre-determined concentration;

adjusting the blended tracer gas to a pre-determined pressure; and returning the blended tracer gas to the one or more test parts.

In this embodiment, the tracer gas recovery rate is increased and the tracer gas purity and delivery pressure is maintained independent of tracer gas flow demand relative to known leak testing methods for multiple, randomly-operated test parts, particularly those that have different internal volumes.

In another embodiment, the invention is a leak testing apparatus comprising:

one or more test parts;

a first gas storage means in fluid communication with the one or more test parts, the first gas storage means having a first pressure analysis means and a first gas analysis means;

a second gas storage means in fluid communication with the first gas storage means, the second gas storage means having a flow control means;

a compressor in fluid communication with the first and second gas storage means, the compressor capable of producing both positive and negative pressures within the leak testing apparatus;

a second gas analysis means in fluid communication with the compressor, the second gas analysis means capable of analyzing gases proximate the compressor; and a third gas storage means in fluid communication with the compressor and the one or more test parts, the third gas storage means having a pressure analysis and adjustment means and a temperature analysis and adjustment means.

In certain embodiments, the first and third gas storage means are buffer tanks while the second gas storage means is a helium storage tank. The first and second gas analysis means include oxygen, helium, nitrogen and moisture analyzers.

BRIEF DESCRIPTION OF THE DRAWINGS

Embodiments of the invention are disclosed with reference to the accompanying drawings and are for illustrative purposes only. The invention is not limited in its application to the details of construction, or the arrangement of the components, illustrated in the drawings. The invention is capable of other embodiments or of being practiced or carried out in other various ways. Like reference numerals are used to indicate like components throughout the drawings.

DETAILED DESCRIPTION OF THE PREFERRED EMBODIMENTS

Various items of equipment, such as fittings, valves, mountings, pipes, wiring, and the like have been omitted to simplify the description. However, such conventional equipment and its uses are known to those skilled in the art and can be employed as desired. Moreover, although the present invention is described below in the context of a leak testing process having a recovery and recycling system using a tracer gas, the invention can be employed with, and has applicability to, many different recovery and/or recycling apparatuses and processes.

Figure 1:
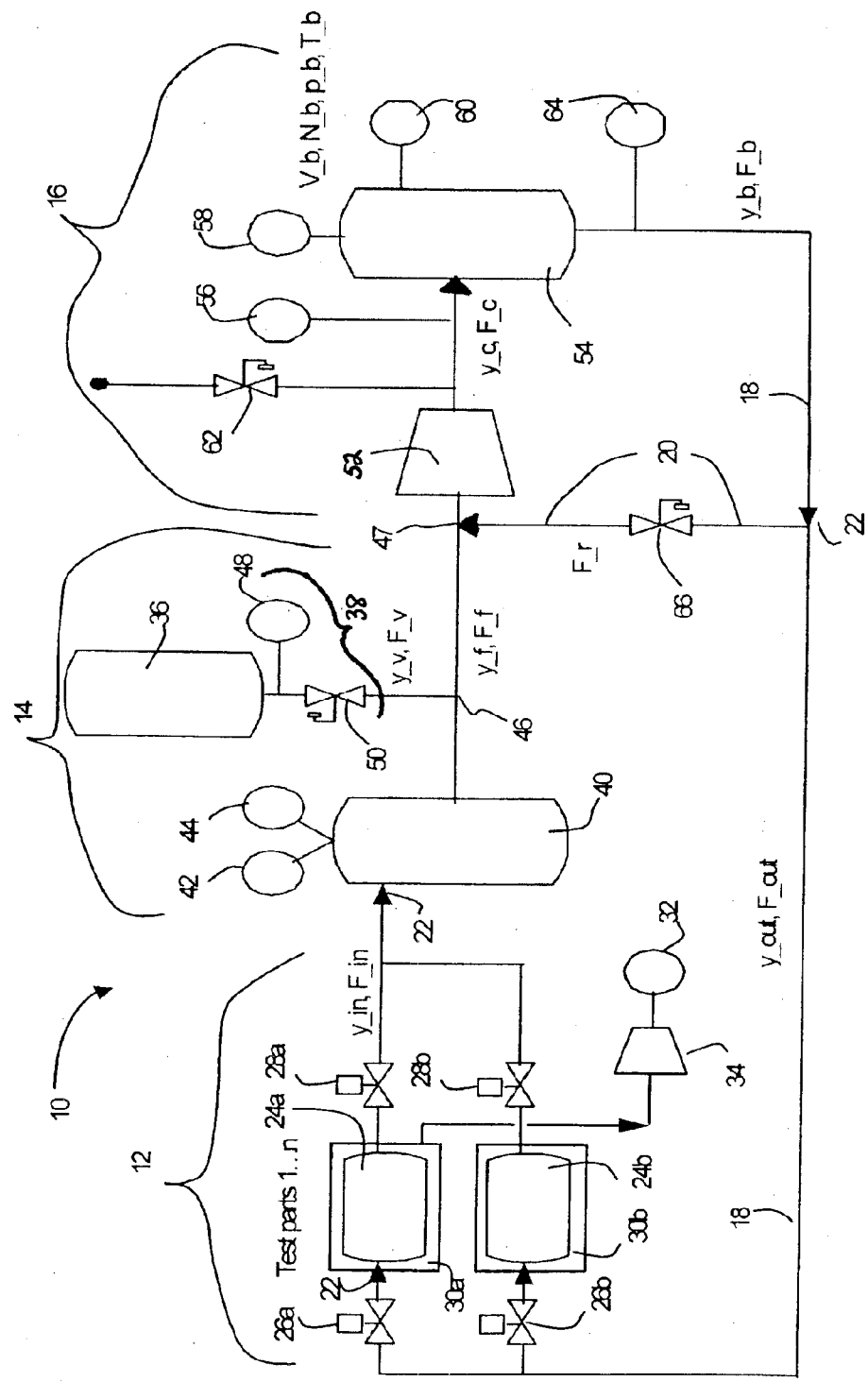
FIG. 1 illustrates a schematic flow diagram of one embodiment of a leak testing process having a tracer gas recovery and recycling system according to one aspect of the invention.

Referring to FIG. 1, a system 10 for recovering and recycling a tracer gas is shown. The tracer gas employed by system 10 can include pure helium (e.g., virgin helium) or a mixture of helium with one or more other gases, e.g., helium-air, helium-nitrogen, helium-argon, helium-carbon dioxide and the like.

System 10 comprises a leak test section 12, a gas recovery/blending section 14, and a gas analysis/recycle section 16, which are in operational association and fluid communication with each other. Fluid communication is available between each of the sections 12, 14, 16 via connective piping 18. In preferred embodiments, system 10 also includes a by-pass loop 20 and/or a purification system (not shown) as known in the art. In FIG. 1, directional arrows 22 indicate the typical direction of flow for fluids (e.g., gases and liquids) within system 10.

Leak test section 12 operates to perform a variety of leak testing functions, and it comprises a plurality of test parts 24a, 24b, (collectively 24), a plurality of gas supply valves 26a, 26b, (collectively 26), and a plurality of gas discharge valves 28a, 28b, (collectively 28). Leak test section 12 can also include a plurality of vacuum chambers 30a, 30b, (collectively 30), a leak test detector means 32, and a vacuum pump 34 (as shown in FIG. 1) each of which can be associated with one or more test parts 24.

Test parts 24 can include a variety of known structures, apparatuses, systems, and the like, capable of carrying, transporting, and/or conducting fluids. For example, test parts 24 can be one or more valves, fittings, pipes, tubes, conduits, pumps, compressors, tanks, and the like. Generally, any device or component capable of routing a fluid can be tested for leaks. Gas supply valves 26 and gas discharge valves 28 function to prohibit or permit a flow of the tracer gas through the leak testing section 12. Gas supply valves 26 and gas discharge valves 28 can include a variety of valves and/or flow control devices as known in the art.

Vacuum chamber 30 functions to receive and/or hold a negative pressure (e.g., a vacuum or partial vacuum). Leak test gas analysis means 32 operates to detect and/or evaluate leaks in test parts 24 and can be any one of a host of commercially available gas detectors known in the industry, such as for example, a mass spectrometer or a gas chromatograph. Vacuum pump 34 is capable of producing and/or generating the negative pressure within vacuum chamber 30 and can be any one of a host of commercially available vacuum pumps known in the industry.

Gas recovery/blending section 14 functions to blend and/or mix gases together, and it comprises a virgin gas storage means 36 associated with flow control means 38, a recovered gas storage means 40 having pressure analysis means 42 and recovered gas analysis means 44. Gas recovery/blending section 14 further defines and includes mixing point 46 which occurs at an intersection of two portions of connective piping 18.

Virgin gas storage means 36 functions as a source of virgin tracer gas (e.g., pure helium). As such, virgin gas storage means 36 is capable of storing virgin tracer gas within system 10 and, through connective piping 18, delivering the virgin tracer gas to mixing point 46. Preferably, virgin gas storage means 36 comprises a helium tank as shown in FIG. 1.

Flow control means 38 operates to permit or prohibit a rate of flow and/or volume of the virgin tracer gas into system 10 and, specifically, to mixing point 46. In a preferred embodiment, flow control means 38 comprises a flow controller 48 (e.g., a mass flow controller) and a valve 50 as shown in FIG. 1.

Recovered gas storage means 40 is capable of receiving, accumulating, storing, and discharging tracer gas that has been expelled by or evacuated from leak testing section 12. In other words, recovered gas storage means 40 contains the tracer gas that is "recovered" from leak testing section 12. Recovered gas storage means 40, through connective piping 18, is capable of delivering the recovered tracer gas to mixing point 46. In a preferred embodiment, recovered gas storage means 40 is capable of a continuous and/or uninterrupted delivery of the recovered tracer gas to mixing point 46. Recovered gas storage means 40 is preferably a buffer tank (e.g., a surge tank) as shown in FIG. 1.

Pressure analysis means 42 functions to measure, evaluate, and/or test a pressure within recovered gas storage means 40 and/or a pressure located "upstream" of mixing point 46. Pressure analysis means 42 can comprise a variety of conventionally known and commercially available pressure monitoring devices such as, for example, a pressure transmitter, a pressure transducer, and the like.

Recovered gas analysis means 44 functions to measure, evaluate, and/or test the tracer gas that is disposed within recovered gas storage means 40 and/or a pressure located "upstream" of mixing point 46. Recovered gas analysis means 44 can comprise one or more of an oxygen analyzer, a helium analyzer, a nitrogen analyzer, a moisture analyzer, and the like.

At mixing point 46, the virgin tracer gas, which is provided by virgin gas supply means 36, is blended, mixed, and/or otherwise combined with the recovered tracer gas, which is provided by recovered gas storage means 40. The blended tracer gas can thereafter be delivered to, and routed through, gas analysis/recycle section 16.

Gas analysis/recycle section 16 operates to evaluate and/or adjust one or more properties of the blended tracer gas such as, for example, a size, number, and concentration of contaminants in the gas, a pressure of the gas, a temperature of the gas, and the like. Gas analysis/recycle section 16 further operates to store and/or discharge the blended tracer gas. Gas analysis/recycle section 16 comprises compressor 52, blended gas storage means 54, blended gas analysis means 56, pressure analysis means 58, pressure adjustment means bypass loop 20, temperature analysis means 60, and vent 62. In a preferred embodiment, gas analysis/recycle section 16 further includes recycled gas analysis means 64.

Compressor 52 is operable to simultaneously generate both positive and negative pressures (e.g., a suction, a partial vacuum, a vacuum, a pushing force, etc.) within sections 12, 14, 16 and other portions of system 10. For example, using the positive and negative pressures, compressor 52 is capable of evacuating tracer gas from test parts 24, blending a recovered tracer gas with a virgin tracer gas at mixing point 46, and urging the blended tracer gas into and through gas analysis/recycle section 16. Therefore, separate vacuum pumps, additional compressors, and the like are not needed by system 10. As such, less equipment is ultimately required for tracer gas recovery, blending, and recycling.

Blended gas storage means 54 is capable of receiving, accumulating, storing, and discharging the blended tracer gas that has been expelled by gas recovery/blending section 14. In other words, blended gas storage means 54 houses tracer gas that was blended in gas recovery/blending section 14 at mixing point 46. Blended gas storage means 54, through connective piping 18, is capable of delivering the blended tracer gas back to test parts 24 such that the blended tracer gas is thereby "recycled". Preferably, blended gas storage means 54 is a buffer tank (e.g., a surge tank) as shown in FIG. 1.

Blended gas analysis means 56 functions to measure, evaluate, and/or test the blended tracer gas that is "downstream" of compressor 52. In preferred embodiments, blended gas analysis means 56 operates to evaluate the blended gas that is "downstream" from mixing point 47 and "upstream" from blended gas storage means 54 as shown in FIG. 1. Blended gas analysis means 56 can comprise one or more of an oxygen analyzer, a helium analyzer, a nitrogen analyzer, a moisture analyzer, a multiple test part process gas purity analyzer, and the like.

Pressure analysis means 58 and temperature analysis means 60 are capable of evaluating a pressure and a temperature, respectfully, of the blended tracer gas stored within or being expelled by blended gas storage means 54. Pressure analysis means 58 can include a variety of pressure measuring devices as known in the art such as, for example, a transducer. Also, temperature analysis means 60 can include a variety of temperature measuring devices as known in the art such as, for example, a transducer.

Gas analysis/recycle section 16 also includes vent 62. Vent 62 functions to permit, if desired or required, a flow or volume of tracer gas to be purged and/or expelled from system 10. If, for example, the size, number, and/or concentration of contaminants within the tracer gas is or becomes unacceptable, vent 62 can be opened to discharge a portion of the contaminated tracer gas. As a result, system 10 can be partially purged of tracer gas. Vent 62 can comprise a variety of valves and/or flow control devices as known in the art.

In a preferred embodiment, gas analysis/recycle section 16 includes recycled gas analysis means 64. Recycled gas analysis means 64 functions to measure, evaluate, and/or test the tracer gas that is "downstream" of blended gas storage means 54 and/or located within the blended gas storage means. Recycled gas analysis means 64 can comprise one or more of an oxygen analyzer, a helium analyzer, a nitrogen analyzer, a moisture analyzer, a multiple test part process gas purity analyzer, and the like.

In a preferred embodiment, system 10 includes pressure adjustment means by-pass loop 20. By-pass loop 20 comprises a valve 66, which can include a variety of pressure regulating devices as known in the art such as, for example a pressure regulator, a flow control valve, or a mass flow controller, and the like, and connective piping 18. By-pass loop 20 generally permits the tracer gas to be routed to the suction end of compressor 52 instead of leak testing section 12 and, in particular, test parts 24. In an exemplary embodiment, system 10 further includes a purification system (not shown) for purifying the tracer gas. Such purification systems typically include filters, gas dryers, or gas separators, and are well known in the art.

In operation, a tracer gas (e.g., a virgin tracer gas, a contaminated tracer gas, a blended tracer gas, a recycled tracer gas, etc.) resides within or is introduced into leak testing section 12, and specifically one or more test parts 24. The tracer gas passes through one or more gas supply valves 26, but is prohibited or restricted by gas discharge valves 28, such that the tracer gas occupies one or more test parts 24 under a positive pressure.

After the tracer gas is in or has been introduced into test parts 24, the leak testing process can be commenced. In other words, test parts 24 can be checked for leaks, cracks, and the like. The leak testing process can continue until the task of identifying and measuring leaks is satisfactorily completed. Thereafter, compressor 52 is operated or continues to operate such that the tracer gas in test parts 24 is evacuated from within the test parts and delivered to recovered tracer gas storage means 40. In other words, the tracer gas that was employed by the leak test process is "recovered" in tracer gas storage means 40. At this point, the recovered tracer gas, if it did not initially, most likely contains contaminants (e.g., impurities, debris, other gases, etc.) as a result or by-product of the leak testing process. Therefore, the recovered tracer gas can be evaluated and/or measured by recovered gas analysis means 44 and/or pressure analysis means 42 to determine one or more properties of the recovered tracer gas such as, for example, pressure, temperature, gas concentration, and number, size, and/or concentration of contaminants.

After evaluation of the recovered tracer gas, compressor 52 operates to draw the recovered tracer gas toward mixing point 46. Depending on the evaluation of the recovered tracer gas, flow control means 38 operates to release a desired flow or volume of the virgin tracer gas from virgin tracer gas supply means 36. When this occurs, the virgin tracer gas is added to, blended with, and/or mixed with the recovered tracer gas at mixing point 46 to produce the "blended" tracer gas. Preferably, the blended tracer gas has a contaminant concentration below a pre-determined concentration. Alternatively, the recycled tracer gas has a helium concentration above a pre-determined helium concentration. In those embodiments where the tracer gas is a helium mixture, the pre-determined helium concentration for the recycled tracer gas can be, for example, in the range of about 95 to about 99.995% helium by volume. In either case, the blended tracer gas is now sufficient for use or re-use by leak testing section 12.

After the blended tracer gas is produced, compressor 52 operates such that the blended tracer gas is delivered to blended gas storage means 54 at or near a delivery pressure (e.g., 300–400 psig) as required by leak testing section 12 and, in particular, test parts 24. If needed, pressure analysis means 58 operates pressure adjustment means 66 within bypass loop 20 to adjust the pressure of the tracer gas within or being discharged from blended gas storage means 54 such that the delivery pressure of recycled gas to leak test station 12 is maintained or achieved. Also, while the blended tracer gas is proximate compressor 52 and/or blended gas storage means 54, blended gas analysis means 56 can intermittently or continuously analyze one or more properties of the blended tracer gas. For example, blended gas analysis means 56 can evaluate a gas concentration, and number, size, and/or concentration of contaminants of the flowing blended tracer gas. In preferred embodiments, analysis by blended gas analysis means 56 occurs at or near the discharge port (not shown) of compressor 52 downstream of mixing point 47 and upstream of gas storage means 54.

A process control system (not shown) such as a computer, PLC, and the like having sufficient computational capabilities can process signals and/or data received from flow controllers 38, valves 26, 28, 50, 62, 66, pressure analysis means 42, 58, temperature analysis means 60, analysis means 44, 56, 64, and the like (collectively "components"). The process control system is capable of examining fluctuations in the purity of the tracer gas that is circulating through system 10 and, based on that examination, make the necessary adjustments to the components to maintain the tracer gas purity (e.g., concentration of tracer gas and/or contaminants) and pressure (e.g., a delivery pressure at the test parts 24) to a tight tolerance.

In one embodiment, prior to mixing and/or blending the recovered tracer gas with the virgin tracer gas, the recovered tracer gas is purified to a desired purity by employing a gas purification system such as gas dryer, membrane separator, cryogenic separator, and/or PSA (pressure swing adsorption) system. In such embodiments, the recovered tracer gas is first purified to above a predetermined helium concentration and then blended with virgin tracer gas to the purity required by the leak testing process (e.g., about 95 to about 99.995% helium by volume) in leak test section 12. The purification step is particularly suited and applicable to leak testing processes where air trapped in test parts 24 needs to be purged from the test parts by using the tracer gas. Such purging typically occurs prior to pressurizing test parts 24 with the tracer gas for testing.

After evaluation by gas analysis means 56 and 64, pressure analysis means 58, and temperature analysis means 60, manipulation of components by process control system (not shown), and/or purification by the purification system (not shown), the blended tracer gas can be discharged from gas analysis section 16. Specifically, the blended tracer gas is expelled from blended gas storage means 54, flows through connective piping 18 under a pressure provided by compressor 52 and pressure adjustment means 66, and can once again enter leak testing section 12 and test parts 24 or can be routed through by-pass loop 20. When the blended tracer gas enters or re-enters leak testing section 12, the blended tracer gas is considered to have been "recycled". In those situations where the recycled tracer gas is delivered back to leak testing section 12, the gas can now be used or re-used for leak testing one or more test parts 24. As before, after the leak testing process is concluded, the sequence of recovery, blending, analysis, and recycling can be continued and/or be repeated.

To illustrate one preferred method of operation for system 10, the following example is provided. Where applicable, several of the symbols defined below and used within equations are noted on FIGS. 1 and 2.

Method

Given Quantities $y_b^{max}$ Maximum permitted contaminant concentration of the gas in buffer 54, dimensionless $y_v$ Contaminant concentration of the virgin gas, dimensionless $p_b^{max}$ Maximum permitted pressure in buffer 54, Pa $p_b^{min}$ Minimum permitted pressure in buffer 54, Pa Measured Quantities $y_{in}$ Contaminant concentration of the recovered gas, dimensionless $y_f$ Contaminant concentration of the gas downstream of mixing point 46, dimensionless $y_b$ Contaminant concentration of the gas within or downstream of buffer 54, dimensionless $F_v$ Virgin gas flow, mol/s $p_b$ Buffer 54 pressure, Pa $T_b$ Buffer 54 temperature, K Other Used Quantities $F_{in}$ Recovered gas flow, mol/s $F_f$ Flow of gas downstream of mixing point 46, mol/s $F_{out}$ Recycled gas flow, mol/s $y_{out}$ Contaminant concentration of the recycled gas, identical with $y_b$ $y_c$ Contaminant concentration of the gas upstream of buffer 54

$F_c$ Flow of gas to buffer 54, mol/s $F_v$ Virgin gas flow, mol/s $F_r$ By-pass gas flow, mol/s $N_b^\Sigma$ Total mol number of gas in the buffer 54, mol $N_b^c$ Number of mols of contaminant in the buffer 54, mol $N_{in}^\Sigma$ Total mol number of gas recovered from test parts 24, mol $N_{out}^\Sigma$ Total mol number of gas recycled to test parts 24, mol $Er_b$ Water volume of the buffer tank 54, m³

$\Delta t$ Total process cycle time, s

Control Targets

Buffer 54 pressure limits, i.e., $$p_b^{min} = p_b = p_b^{max} \tag{1}$$

Buffer 54 contamination limits, i. e., $$y_b = y_b^{max} (y_b^{max} > y_v) \tag{2}$$

Compressor 52 flow limit, i.e., $$F_c = F_c^{min} \tag{3}$$

Reduced Scheme

The recycle flow $F_r$ assures a minimum flow through the compressor, see relation (3). The flow $F_r$ does not change the mass balance of the buffer tank, however, it assures that the buffer gas is homogeneously blended, and assures constant delivery pressure of recycled gas, i.e. flow $F_{out}$. Furthermore, the contaminant concentration $y_c$ of the gas passing the compressor can solely be expressed in terms of $y_f$ and $y_r$. Consequently, the control considerations for the process scheme as shown in FIG. 1 can be reduced to that shown in FIG. 2.

Figure 2:
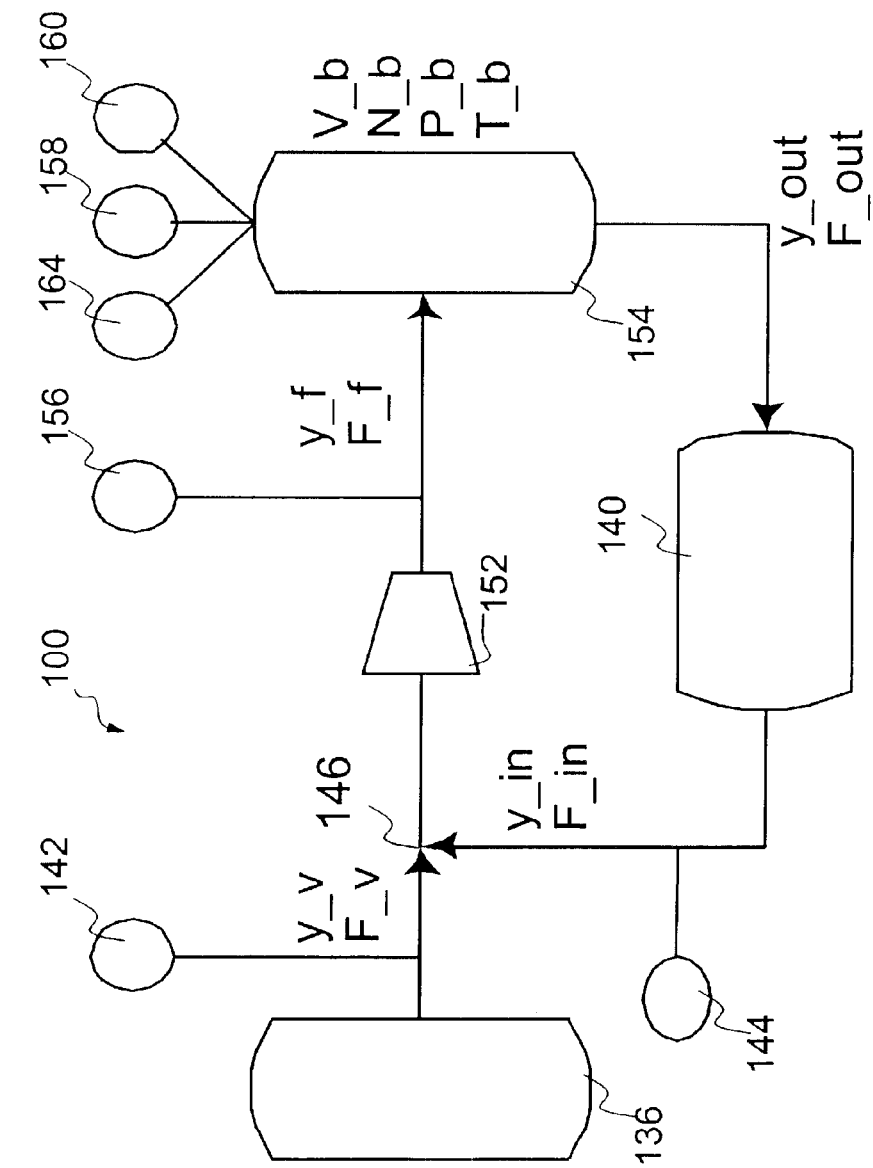
FIG. 2 illustrates a simplified process flow scheme for the control considerations in the leak testing process of FIG. 1.

In FIG. 2, the simplified process flow scheme 100 comprises virgin gas storage means 136, recovered gas storage means 154, flow control means 142, recovered gas analysis means 144, mixing point 146, compressor 152, blended gas storage means 154, blended gas analysis means 156, recycled gas analysis means 164, pressure analysis means 158, and temperature analysis means 160. Each of the devices in FIG. 2 generally functions in similar fashion to those equivalently named devices illustrated in FIG. 1. Target (3) can be considered utterly independent from the other target requirements.

Controlled Quantities $f_v$ recovery gas flow

Process Behavior

The gas recovery/blending section blends the virgin gas flow $F_v$ (mol/s) at a fixed impurity concentration $y_v$ and recovered gas flow $F_{in}$ with the impurity concentration $y_{in}$, determined by analysis means 44 (FIG. 1). The resultant blend gas is then supplied to buffer 54 at flow $F_f$ with the impurity $y_f$. Mass balance for the mixing process at point 46 is given by:

$$F_f = F_v + F_{in} \tag{4}$$

and $$y_f F_f = y_v F_v + y_{in} F_{in} \tag{5}$$

From these balanced equations, one can derive an explicit expression for $F_{in}$:

$$F_{in} = \frac{y_{in} - y_f}{y_f - y_v} F_v \tag{6}$$

and for the feeding flow $F_f$, one finds that:

$$F_f = \frac{y_{in} - y_v}{y_f - y_v} F_v \tag{7}$$

Since the production process contaminates the recovered gas, the concentrations fulfill the following inequality:

$$y_v < y_f < y_{in}, \tag{8}$$

i.e., all factors in (6) and (7) are non-negative.

Buffer tank 54 accumulates the blended gas and maintains it a pressure $p_b$. The pressure and concentration targets for the gas in buffer 54 are given by inequalities (1) and (2).

The bypass flow $F_r$ assures that the flow $F_c$ is maintained such that:

$$F_c = F_f + F_r = F_c^{min} \tag{9}$$

Buffer 54 pressure $p_b$, temperature $T_b$, and the impurity concentration $y_b$ are determined by means of transducers 58 and 60, and analyzer 64 (FIG. 1). The total mol number $N_b^\Sigma$ (mol) of gas in the buffer 54 can be calculated from the equation of state:

$$p_b = p\left(\frac{V_b}{N_b^\Sigma}, T_b, y_b\right) \text{ (buffer state, } p \text{ mixture equation of state).} \tag{10}$$

The mass balance for the buffer at any instant is given by:

$$N_b^\Sigma(t) = N_b^\Sigma(t_0) + \int_{t_0}^{t} F_f(s) - F_{out}(s)\,ds \tag{11}$$

and the concentration balance is:

$$y_b(t)N_b^\Sigma(t) = y_b(t_0)N_b^\Sigma(t_0) + \int_{t_0}^{t} y_f(s)F_f(s) - y_{out}(s)F_{out}(s)\,ds. \tag{12}$$

Since $N_B^\Sigma$ is determined by equation (10), equation (11) can be used to calculate $F_{out}$ as:

$$F_{out} = F_f - \frac{dN_b^\Sigma}{dt} \tag{13}$$

or as integral balance:

$$\int_{t_0}^{t} F_{out}(s)\,ds = \int_{t_0}^{t} F_f(s)\,ds - N_b^{\Sigma}(t) + N_b^{\Sigma}(t_0) \qquad (14)$$

Production Process Model

The production process (i.e. testing of parts 24) works discontinuously, i.e. a certain amount $N_{out}^{\Sigma}$ of gas is taken from buffer 54 during a time period $\Delta t_{out}$ and after a production time period $\Delta t_{prod}$ a partial amount $N_{in}^{\Sigma}$ of the gas is returned during a time period $\Delta t_{in}$ including an additional amount $N_{in}^{c}$ of contaminated gas. This process behavior can be modeled by:

$$N_{in}^{\Sigma} = xN_{out}^{\Sigma} + N_{in}^{c} \qquad (15)$$

i.e., the average impurity concentration of the recovered gas, $\bar{y}_{in}$ over one production cycle according to this model is:

$$\bar{y}_{in} = \frac{xy_{out}N_{out}^{\Sigma} + N_{in}^{c}}{xN_{out}^{\Sigma} + N_{in}^{c}} \qquad (16)$$

The total mol number of gas recovered from test parts 24 during one production cycle can be expressed in terms of $F_{in}$ and $F_{out}$, respectively, by:

$$N_{in}^{\Sigma} = \int_{t}^{t+\Delta t} F_{in}(s)\,ds,\; N_{out}^{\Sigma} = \int_{t}^{t+\Delta t} F_{out}(s)\,ds \qquad (17)$$

considering the time period:

$$\Delta t = \Delta t_{out} + \Delta t_{prod} + \Delta t_{in} \qquad (18)$$

Figure 3:
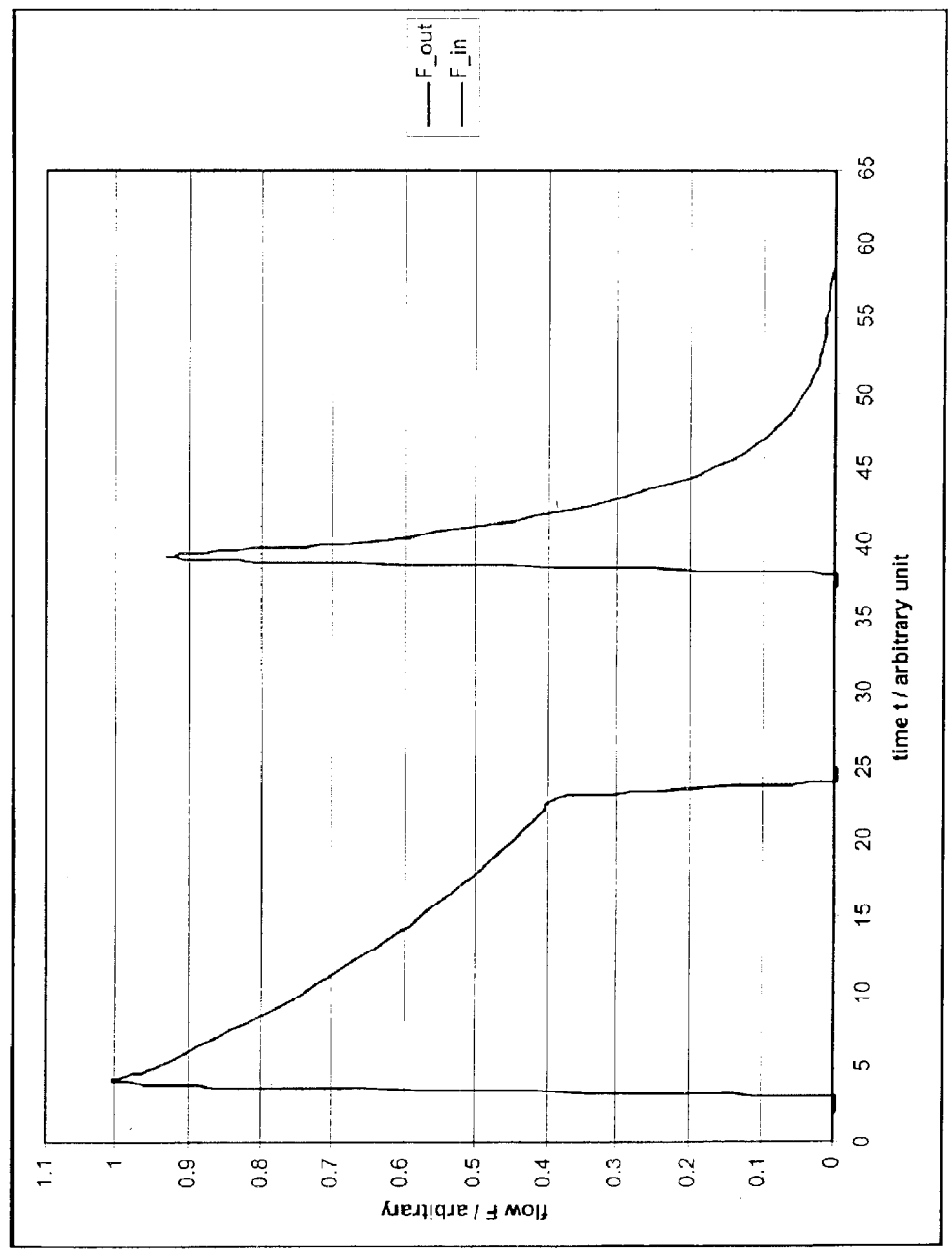
FIG. 3 illustrates a graph detailing the qualitative behavior for a test part using the system of FIG. 1.

The corresponding flows $F_{out}$ and $F_{in}$ may vary strongly during these time periods. FIG. 3 shows the qualitative behavior for one test part and provides an example of time dependencies of flows $F_{out}$ and $F_{in}$.

Control Strategy

Concentration Target

The total delay time of the process is stipulated by the total process time (18). Considering a full process cycle which ends at time, t, the total amount of gas added to buffer 54 during the cycle is:

$$N_{cyc}^{\Sigma}(t+\Delta t) = \int_{t}^{t+\Delta t} F_f(s)\,ds \qquad (19)$$

Denoting with $N_{cyc}^{c}$ the number of mols of contaminant added to buffer 54 as part of total gas amount $N_{cyc}^{\Sigma}$, then the contaminant concentration of the buffer is given by:

$$y_b(t+\Delta t) = \qquad (20)$$

$$\frac{y_b(t)N_b^{\Sigma}(t) + N_{cyc}^{c}(t+\Delta t)}{N_b^{\Sigma}(t) + N_{cyc}^{\Sigma}(t+\Delta t)} = \frac{y_b(t)N_b^{\Sigma}(t) + \int_{t}^{t+\Delta t} y_f(s)F_f(s)\,ds}{N_b^{\Sigma}(t) + \int_{t}^{t+\Delta t} F_f(s)\,ds}$$

Using mass balance equs. (4) and (5), one obtains:

$$y_b(t+\Delta t) = \frac{y_b(t)N_b^{\Sigma}(t) + \int_{t}^{t+\Delta t} y_{in}F_{in}(s) + y_v F_v(s)\,ds}{N_b^{\Sigma}(t) + \int_{t}^{t+\Delta t} F_{in}(s) + F_v(s)\,ds} \qquad (21)$$

At the end of the cycle period $\Delta t$, the concentration target (2) is fulfilled (i.e., $y_b(t+\Delta t) = y_b^{max}$), hence equation (21) yields:

$$\int_{t}^{t+\Delta t} F_v(s)\,ds = \int_{t}^{t+\Delta t} \frac{y_{in}(s) - y_b^{max}}{y_b^{max} - y_v} F_{in}(s)\,ds - \frac{y_b^{max} - y_b(t)}{y_b^{max} - y_v} N_b^{\Sigma}(t) \qquad (22)$$

The right hand side of this equation depends on "future" values of the recovered gas, therefore, a predictive model for the test part behavior is needed to predict $y_{in}(s)$ and $F_{in}(s)$ for $t \leq s \leq t = \Delta t$. Under the heading entitled "Production Process Model", such a model was derived.

To solve equation (22) approximately, it is assumed that the virgin gas flow $F_v$ changes with constant speed over the time period $\Delta t$, i.e., $$F_v(s) = F_v(t) + \Delta F_v \frac{s-t}{\Delta t} \qquad (23)$$

for $t \leq s \leq t+\Delta t$ where $\Delta F_v$ (mol/s²) stands for rate of change of $F_v$. The rate of change $\Delta F_v$ can be calculated from (22) as:

$$\Delta F_v = \qquad (24)$$

$$2\left\{\frac{1}{\Delta t}\int_{t}^{t+\Delta t} \frac{y_{in}(s) - y_b^{max}}{y_b^{max} - y_v} F_{in}(s)\,ds - \frac{y_b^{max} - y_b(t)}{y_b^{max} - y_v} \frac{N_b^{\Sigma}(t)}{\Delta t} - F_v(t)\right\}$$

$\Delta F_v$ can be interpreted as a minimum rate of change of $F_v$ to maintain buffer 54 contamination concentration below target concentration, i.e. $y_b \leq y_b^{max}$. Depending on $y_{in}$ and $y_b$ the rate of change can be negative even for $F_v = 0$.

Pressure Target

The buffer state is described by equation (10), so that at any instant, t, one can calculate the number of mols $N_b^{\Sigma}(t)$ of gas in buffer 54 by using:

$$P_b(t) = p\left(\frac{\bar{V}_b}{N_b^{\Sigma}(t)}, T_b(t), y_b(t)\right) \qquad (25)$$

and the measured values for $p_b$, $T_b$ and $y_b$. Analogously for any given target pressure $p_b^{target}$ the corresponding target of mol number $N_b^{\Sigma,target}$ can be determined by means of:

$$p_b^{target} = p\left(\frac{\bar{V}_b}{N_b^{\Sigma,target}(t)}, T_b(t), y_b(t)\right) \qquad (26)$$

The content control for buffer 54 is based on a two point regulation. However, in contrast to the classical on/off regulation, the control is based on varying the virgin gas flow $F_v$.

Having a target interval for the regulated buffer pressure:

$$p_b^{min} < \bar{p}_b < p_b^{max} \qquad (27)$$

the corresponding target mol numbers $\underline{N}_b^{\Sigma,target}$ and $\overline{N}_b^{\Sigma,target}$ can be calculated from (26).

Buffer Under-Filled

In the case of an under-filled buffer, the under-filled condition can be represented by:

$$N_b^\Sigma \leq \underline{N_b}^{\Sigma, target} \quad (28)$$

the target is to top the buffer in a time period $\Delta t_{top}/\Delta t$. To achieve this target on has to add $\Delta N_b^\Sigma$ to the buffer during the time period $\Delta t_{top}$, i.e., $$\Delta N_b^\Sigma = \underline{N_b}^{\Sigma, target} - N_b^\Sigma = \int_t^{t+\Delta\, top} F_f(s) ds = \int_t^{t+\Delta\, top} F_{in}(s) + F_v(s) ds \quad (29)$$

Using the linearized approximation (23) for $F_v$, one obtains:

$$\Delta F_v^{top} = 2 \left\{ \frac{N_b^{\Sigma, target} - N_b^\Sigma}{\Delta t_{top}} - \frac{1}{\Delta t_{top}} \int_t^{t+\Delta t_{top}} F_{in}(s) ds = F_v(t) \right\} \quad (30)$$

which can be used to obtain the target for the virgin gas flow $F_v^{target}$. Note for $\Delta t_{top} \to 0$, one obtains $\Delta F_v^{top} \to \infty$. In case the actual buffer pressure $p_b$ approaches $p_b^{min}$ in the refilling of the buffer becomes more urgent, so that $\Delta t_{top}$ should be selected as:

$$\Delta t_{top} = k \frac{p_b - p_b^{min}}{p_b - p_b} \Delta t \quad (31)$$

for some k>0 which assures that:

$$F_v \xrightarrow[p_b \to p_b^{max}]{} F_v^{max} \quad (32)$$

To control the virgin gas flow $F_v$, one has to calculate both $\Delta F_v^{top}$ and $\Delta F_v$ according to (24) and (30), respectively, and sets:

$$F_v(s) = F_v(t) + \max\left( \Delta F_v^{top} \frac{s-t}{\Delta t_{top}}, \Delta F_v \frac{s-t}{\Delta t} \right) \quad (33)$$

Buffer Filled

In the case of a filled buffer, the buffer filled condition is represented by:

$$\underline{N_b}^{\Sigma, target} < N_b^\Sigma < \overline{N_b}^{\Sigma, target} \quad (34)$$

The only control target is to maintain the concentration target, i.e. the control is solely based on equation (24). However, formula (33) already includes this behavior since for condition (34) the term $\Delta N_b^\Sigma$ becomes negative.

Buffer Over-Filled

In the case of an over-filled buffer, the buffer over-filled condition is represented by:

$$N_{;b;target}^\Sigma < N_b;^\Sigma, \quad (35)$$

and venting is the only possibility. The venting process needs to be continued until equation (30) yields a positive value for $\Delta F_v^{top}$. To prevent any process oscillation between venting and buffer topping, a threshold value $\Delta F_v^{min}$ needs to be stipulated and the venting process is interrupted when:

$$\Delta F_v^{top} > \Delta F_v^{min} \quad (36)$$

is fulfilled.

The method proposed in the present invention eliminates leak testing process variability caused by fluctuations in tracer gas purity and delivery pressure by maintaining the purity and the delivery pressure of the tracer gas constant under the condition of random flow demand while increasing the tracer gas recovery rate to that maximum possible without the purification step.

The method disclosed employs a model based flow control strategy that, among other things, provides the following advantages and/or benefits: eliminates the need for regular depressurizing and purging of system 10 by keeping the level of impurities in the recovered gas constant; improves the stability of the leak test process and maximizes tracer gas recovery while controlling the level of impurities in the recovered tracer gas; recycles an increased (and preferably a maximum possible) portion of the recovered tracer gas; controls the level of impurities in the tracer gas such that the tracer gas is supplied to leak testing section 12 at a substantially constant tracer gas concentration under randomly varying tracer gas flow demand; and optimizes the flow through gas recovery/blending section 14 and gas analysis/recycle section 16 by predicting the tracer gas flow demand.

The present invention (i.e., each of the apparatus and the method) has numerous advantages. For example, the invention assures that a tracer gas recovery rate is increased and/or maximized. The invention also insures that the purity of the tracer gas stream $F_{out}$ remains at least substantially constant, i.e. no toggling between only recovered gas, only virgin gas, and blended gas. As such, analysis means 44 and 56, are permitted to return results that are stable and accurate. Further, the invention insures that a flow and a pressure of the tracer gas stream remains at least substantially constant, i.e. no pressure fluctuation caused by toggling between only recovered gas, only virgin gas, and blended gas.

The invention further requires only small capacity buffer tanks 36 and 54, typically on order of 1 to 4 times the tracer gas volume of tested parts (e.g., statistically larger number parts tested in multiplicity or in rapid succession require smaller capacity buffers, and vice versa). In other words, the invention does not require high-capacity storage tanks for the recovered and recycled (i.e., blended) tracer gas. The invention also avoids the need for a separate vacuum pump to increase and/or maximize the tracer gas recovery.

Further, the invention permits uninterrupted tracer gas recovery without having to depressurize the recovery system and/or completely purge the system of recovered gas even in instances when the recovered gas is highly contaminated. Further, when venting is desirable, the invention permits expelling appropriate amount of contaminated gas while still maintaining pressure of the recycled gas constant by employing, for example, vent 62 and bypass loop 20. Further, the invention simplifies the process and the apparatus for recovery of the tracer gas (e.g. lower equipment requirements result in lower system cost and reliability, and in improved process stability).

Additionally, the invention increases the tracer gas recovery rate and allows control of the tracer gas purity and delivery pressure with high accuracy, without surges, irrelevant of flow demand. Also, in contrast to conventional recovery systems, the proposed apparatus allows uninterrupted recovery of tracer gas even during purging of test parts with tracer gas to displace trapped air.

Despite any methods being outlined in a step-by-step sequence, the completion of acts or steps in a particular chronological order is not mandatory. Further, elimination, modification, rearrangement, combination, reordering, or the like, of acts or steps is contemplated and considered within the scope of the description and appended claims. All U.S. patents and allowed U.S. patent applications identified above are incorporated herein by reference.

While the present invention has been described in terms of the preferred embodiment, it is recognized that equivalents, alternatives, and modifications, aside from those expressly stated, are possible and within the scope of the appended claims.

What is claimed is:

1. A method for recovering and recycling a tracer gas from one or more test parts, the method comprising:
   A. providing an apparatus comprising:
      (1) one or more test parts, each test part in fluid communication with a gas supply valve and a gas discharge valve;
      (2) a recovered tracer gas storage means in fluid communication with the one or more test parts through their respective gas discharge valves;
      (3) at least one of a first pressure analysis means and a first gas composition analysis means in fluid communication with the recovered tracer gas storage means;
      (4) a compressor in fluid communication with the recovered tracer gas storage means, a virgin tracer gas storage means, and a second gas composition analysis means;
      (5) a blended tracer gas storage means in fluid communication with the compressor and the one or more test parts;
      (6) at least one of a second pressure analysis means, a temperature analysis means, and a second gas composition analysis means in fluid communication with the blended tracer gas storage means; and
      (7) a by-pass loop in fluid communication with the blended tracer gas storage means and the compressor,
   B. introducing a tracer gas into the one or more test parts through the gas supply valve that is in fluid communication with the test part;
   C. evacuating at least a portion of the tracer gas from the one or more test parts through the gas discharge valve that is in fluid communication with the test part and into the recovered tracer gas storage means;
   D. analyzing the recovered tracer gas with at least one of the first pressure analysis means and the first gas composition analysis means to determine at least one of pressure and contaminant concentration of the recovered tracer gas;
   E. evacuating at least a portion of the recovered tracer gas from the recovered tracer gas storage means, adding virgin tracer gas from the virgin tracer gas storage means to the recovered and analyzed tracer gas to produce a blended tracer gas, and analyzing a quality of the blended tracer gas using the second gas composition analysis means to determine the contaminant concentration of the blended tracer gas;
   F. delivering the blended tracer gas to the blended tracer gas storage means, and further determining the quality of the blend tracer gas by measuring the pressure, temperature and contaminant concentration of the blended tracer gas using the second pressure analysis means, the temperature analysis means, and the second gas composition analysis means, respectively; and
   G. returning the blended tracer gas from the blended tracer gas storage means to the one or more test parts;
   wherein (i) blended tracer gas continuously circulates within the apparatus regardless of whether the gas supply and discharge valves to the test parts are open or closed, (ii) movement of the tracer gas throughout the apparatus is a result of the operation of the compressor, and (iii) if the gas supply valve to a test part is closed, then at least a portion of the blended tracer gas is recycled backed to the blended tracer gas storage means through the by-pass loop.

2. The method of claim 1, wherein the tracer gas is helium.

3. The method of claim 1 wherein the tracer gas is a mixture of helium and at least one or other gas selected from the group consisting of air, nitrogen, argon and carbon dioxide.

4. The method of claim 1 wherein the method further comprises performing a leak testing process with the tracer gas introduced into the one or more test parts.

5. The method of claim 1 wherein the method includes the additional steps of (i) providing an exhaust vent in fluid communication with the compressor, and (ii) withdrawing through the vent a portion of the recovered and analyzed tracer gas to maintain the quality of the blended tracer gas at the pre-determined pressure or the contaminant concentration below a pre-determined concentration.

6. The method of claim 1 wherein the pressure of the blended tracer gas is adjusted to the pre-determined pressure by controlling the flow of the blended tracer gas through the by-pass loop.

7. A method for recovering and recycling a tracer gas simultaneously from at least two randomly operated test parts, the method comprising:
   A. Providing an apparatus comprising:
      (1) at least two randomly operated test parts, each test part in fluid communication with a gas supply valve and a gas discharge valve;
      (2) a recovered tracer gas storage means in fluid communication with the at least two randomly operated test parts through their respective gas discharge valves;
      (3) at least one of a first pressure analysis means and a first gas composition analysis means in fluid communication with the recovered tracer gas storage means;
      (4) a compressor in fluid communication with the recovered tracer gas storage means, a virgin tracer gas storage means, and a second gas composition analysis means;
      (5) a blended tracer gas storage means in fluid communication with the compressor and the at least two randomly operated test parts;
      (6) at least one of a second pressure analysis means, a temperature analysis means, and a second gas composition analysis means in fluid communication with the blended tracer gas storage means; and
      (7) a by-pass loop in fluid communication with the blended tracer gas storage means and the compressor,
   B. introducing a tracer gas into the at least two randomly operated test parts through the gas supply valves that are in fluid communication with each test part;
   C. evacuating at least a portion of the tracer gas from the at least two randomly operated test parts through the gas discharge valve that is in fluid communication with each test part and into the recovered tracer gas storage means;
   D. analyzing the recovered tracer gas with at least one of the first pressure analysis means and the first gas analysis means to determine at least one of pressure and contaminant concentration of the recovered tracer gas;
   E. evacuating at least a portion of the recovered tracer gas from the recovered tracer gas storage means, adding virgin tracer gas from the virgin tracer gas storage means to the recovered and analyzed tracer gas to produce a blended tracer gas, and analyzing the quality of the blended tracer gas using the second gas composition analysis means to determine the contaminant concentration of the blended tracer gas;

F. delivering the blended tracer gas to the blended tracer gas storage means, and further determining the quality of the blend tracer gas by measuring the pressure, temperature and contaminant concentration of the blended tracer gas using the second pressure analysis means, the temperature analysis means, and the second gas composition analysis means, respectively; and G. returning the blended tracer gas from the blended tracer gas storage means to the at least two randomly operated test parts;

wherein (i) blended tracer gas continuously circulates within the apparatus regardless of whether the gas supply and discharge valves to the test parts are open or closed, (ii) movement of the tracer gas throughout the apparatus is a result of the operation of the compressor, and (iii) if the gas supply valve to a test part is closed, then at least a portion of the blended tracer gas is recycled backed to the blended tracer gas storage means through the by-pass loop.

8. The method of claim 7 in which the tracer gas is helium.

9. The method of claim 7 wherein the tracer gas is a mixture of helium and at least one or other gas selected from the group consisting of air, nitrogen, argon and carbon dioxide.

10. The method of claim 7 wherein the method further comprises performing a leak testing process with the tracer gas introduced into the at least two test parts.

11. The method of claim 7 wherein the method includes the additional steps of (i) providing an exhaust vent in fluid communication with the compressor, and (ii) withdrawing through the vent a portion of the recovered and analyzed tracer gas to maintain the quality of the blended tracer gas at the pre-determined pressure or the contaminant concentration below a pre-determined concentration.

12. The method of claim 7 wherein the pressure of the blended tracer gas is adjusted to the pre-determined pressure by controlling the flow of the blended tracer gas through the by-pass loop.

* * * * *